(12) United States Patent
Gozu

(10) Patent No.: US 12,122,100 B2
(45) Date of Patent: Oct. 22, 2024

(54) THREE-DIMENSIONAL SHAPING DEVICE

(71) Applicant: SEIKO EPSON CORPORATION, Tokyo (JP)

(72) Inventor: Masayuki Gozu, Ina (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/896,128

(22) Filed: Aug. 26, 2022

(65) Prior Publication Data

US 2023/0062207 A1 Mar. 2, 2023

(30) Foreign Application Priority Data

Aug. 27, 2021 (JP) .................................. 2021-138676

(51) Int. Cl.
| | |
|---|---|
| B29C 64/35 | (2017.01) |
| B22F 12/17 | (2021.01) |
| B22F 12/53 | (2021.01) |
| B28B 1/00 | (2006.01) |
| B29C 64/209 | (2017.01) |
| B29C 64/295 | (2017.01) |
| B33Y 30/00 | (2015.01) |
| B33Y 40/00 | (2020.01) |

(52) U.S. Cl.
CPC .............. B29C 64/35 (2017.08); B22F 12/17 (2021.01); B22F 12/53 (2021.01); B28B 1/001 (2013.01); B29C 64/209 (2017.08); B29C 64/295 (2017.08); B33Y 30/00 (2014.12); B33Y 40/00 (2014.12)

(58) Field of Classification Search
CPC ..... B29C 64/35; B29C 64/295; B29C 64/209; B22F 12/17; B22F 12/53; B28B 1/001
USPC ........................................................ 425/225
See application file for complete search history.

(56) References Cited

U.S. PATENT DOCUMENTS

| | | | | |
|---|---|---|---|---|
| 7,311,378 | B2* | 12/2007 | Fujimori | B41J 2/16552 347/108 |
| 7,744,364 | B2* | 6/2010 | Turley | B29C 48/272 425/375 |
| 2008/0317894 | A1* | 12/2008 | Turley | B29C 64/209 425/226 |
| 2015/0097053 | A1* | 4/2015 | Batchelder | B33Y 30/00 239/135 |
| 2019/0351617 | A1* | 11/2019 | Heston | B29C 64/227 |
| 2020/0045990 | A1* | 2/2020 | Hoff | A23G 1/206 |

FOREIGN PATENT DOCUMENTS

JP 2010-530326 A 9/2010

* cited by examiner

*Primary Examiner* — Alison L Hindenlang
*Assistant Examiner* — Erica Hartsell Funk
(74) *Attorney, Agent, or Firm* — Harness, Dickey & Pierce, P.L.C.

(57) ABSTRACT

A three-dimensional shaping device includes: a discharge unit having a nozzle and configured to discharge a material toward a stage; a cleaning mechanism configured to clean the nozzle; and a moving unit configured to move the discharge unit and the cleaning mechanism relative to the stage. The moving unit is configured to move the cleaning mechanism relative to the stage in conjunction with the movement of the discharge unit relative to the stage.

16 Claims, 11 Drawing Sheets

THREE-DIMENSIONAL SHAPING DEVICE

The present application is based on, and claims priority from JP Application Serial Number 2021-138676, filed Aug. 27, 2021, the disclosure of which is hereby incorporated by reference herein in its entirety.

BACKGROUND

1. Technical Field

The present disclosure relates to a three-dimensional shaping device.

2. Related Art

There is known a three-dimensional shaping device that shapes a three-dimensional shaped object by discharging a plasticized material onto a stage, laminating the plasticized material, and curing the plasticized material.

For example, JP-T-2010-530326 (Patent Literature 1) describes a three-dimensional shaping device configured to move an extrusion head on a horizontal x-y plane, and moves the extrusion head to an edge cleaning assembly to periodically clean the extrusion head by the edge cleaning assembly.

As described above, when cleaning is performed by moving the head to a cleaning mechanism, it is necessary to move the head over a long distance depending on a position of the head for which shaping is performed. Therefore, during the movement of the head, a residue in the head drops and adheres to the shaped object, which may affect the shaping accuracy.

SUMMARY

One aspect of a three-dimensional shaping device according to the present disclosure includes:
 a discharge unit having a nozzle and configured to discharge a material toward a stage;
 a cleaning mechanism configured to clean the nozzle; and
 a moving unit configured to move the discharge unit and the cleaning mechanism relative to the stage, and
 the moving unit is configured to move the cleaning mechanism relative to the stage in conjunction with a movement of the discharge unit relative to the stage.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. In addition, not all configurations to be described below are necessarily essential components of the present disclosure.

1. Three-Dimensional Shaping Device

1.1. Overall Configuration

Figure 1:
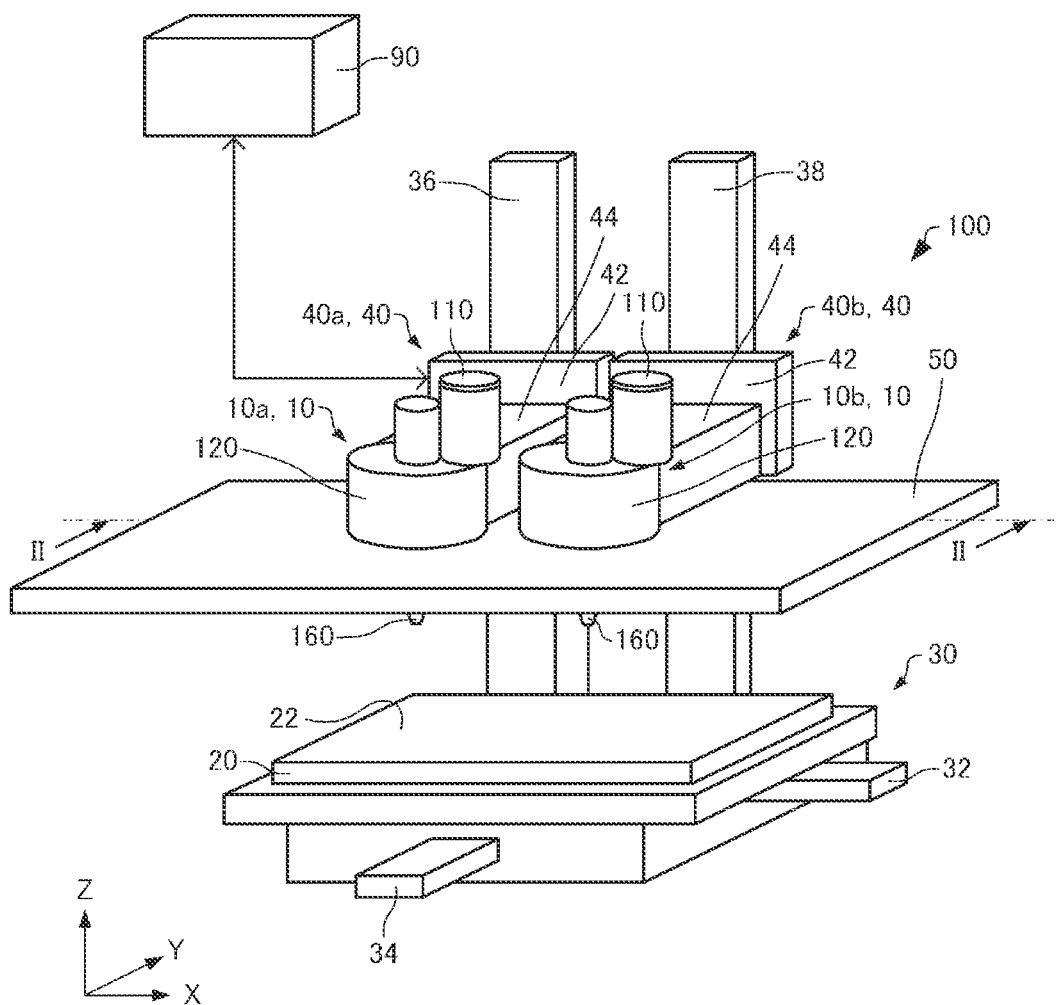
FIG. 1 is a perspective view schematically showing a three-dimensional shaping device according to an embodiment.
Figure 2:
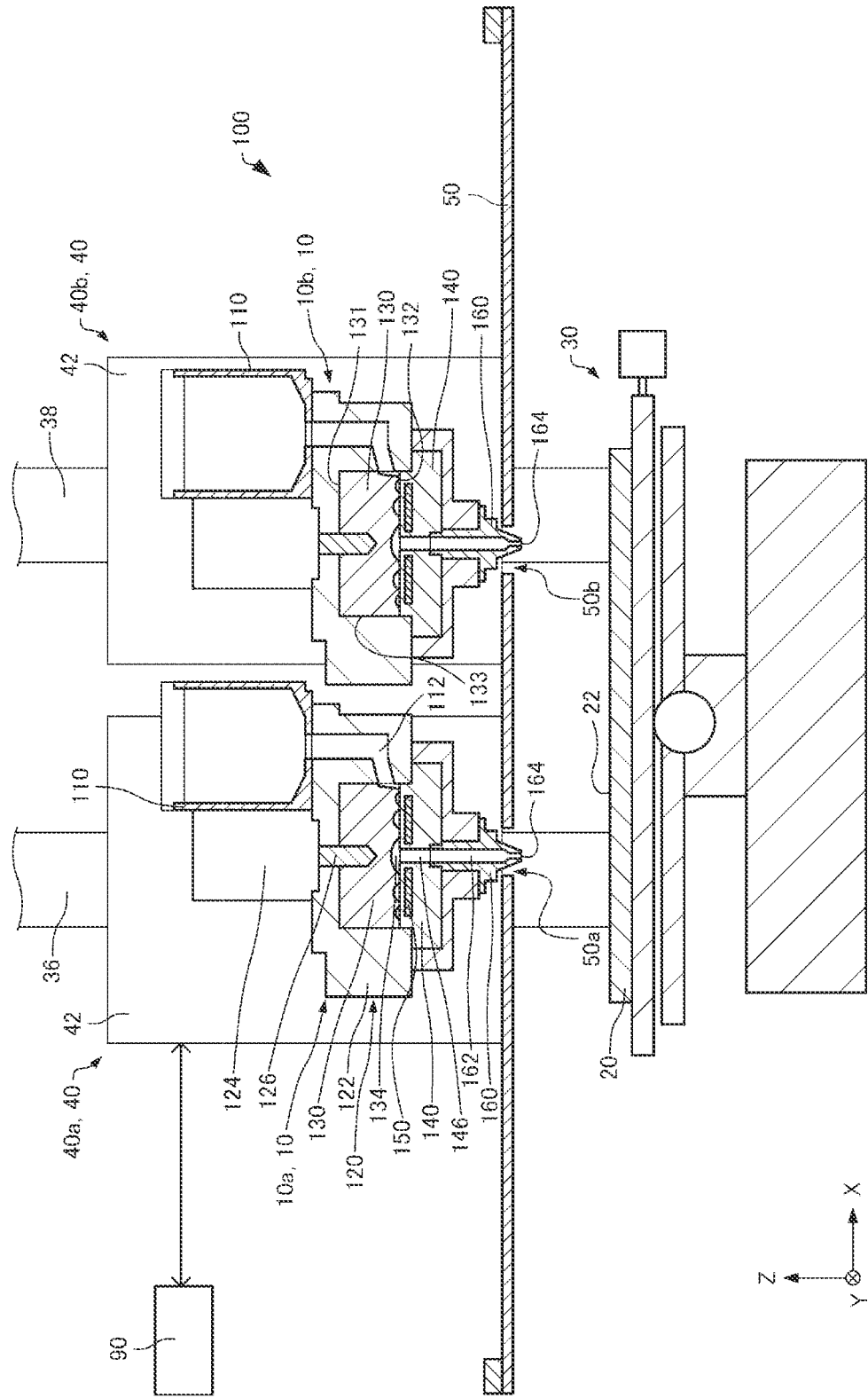
FIG. 2 is a cross-sectional view schematically showing the three-dimensional shaping device according to the present embodiment.

First, a three-dimensional shaping device according to the present embodiment will be described with reference to the drawings. FIG. 1 is a perspective view schematically showing a three-dimensional shaping device 100 according to the present embodiment. FIG. 2 is a cross-sectional view taken along line II-II of FIG. 1, schematically showing the three-dimensional shaping device 100 according to the present embodiment. In FIGS. 1 and 2, an X-axis, a Y-axis, and a Z-axis are shown as three axes orthogonal to one another. An X-axis direction and a Y-axis direction are, for example, horizontal directions. A Z-axis direction is, for example, a vertical direction.

As shown in FIGS. 1 and 2, the three-dimensional shaping device 100 includes, for example, a first discharge unit 10*a* and a second discharge unit 10*b* as a discharge unit 10, a stage 20, a moving unit 30, a first support unit 40*a* and a second support unit 40*b* as a support unit 40, a heating unit 50, a first cleaning mechanism 60*a* and a second cleaning mechanism 60*b* as a cleaning mechanism 60, a first cleaning moving unit 70*a* and a second cleaning moving unit 70*b* as a cleaning moving unit 70, a collection box 80, and a control unit 90. For convenience, the cleaning mechanisms 60*a*, 60*b*, the cleaning moving units 70*a*, 70*b*, and the collection box 80 are not shown in FIGS. 1 and 2.

The three-dimensional shaping device 100 drives the moving unit 30 to change relative positions between the discharge units 10*a*, 10*b* and the stage 20 while discharging a plasticized material from the discharge units 10*a*, 10*b* toward the stage 20. Accordingly, the three-dimensional shaping device 100 shapes a three-dimensional shaped object having a desired shape on the stage 20.

The first discharge unit 10a and the second discharge unit 10b are, for example, provided side by side in the X-axis direction. In the illustrated example, the first discharge unit 10a is positioned in the −X-axis direction of the second discharge unit 10b. The discharge units 10a, 10b discharge the plasticized material toward the stage 20.

Each of the first discharge unit 10a and the second discharge unit 10b includes, for example, a material supply unit 110, a plasticization unit 120, and a nozzle 160. The first discharge unit 10a and the second discharge unit 10b basically have the same configuration.

A pellet-shaped or powder-shaped material is charged into the material supply unit 110. The material supply unit 110 supplies, to the plasticization unit 120, the material serving as a raw material. The material supply unit 110 is implemented by, for example, a hopper. The material supply unit 110 and the plasticization unit 120 are coupled by a supply path 112 provided below the material supply unit 110. The material supplied to the material supply unit 110 is supplied to the plasticization unit 120 via the supply path 112. The type of the material supplied by the material supply unit 110 will be described later.

As shown in FIG. 2, the plasticization unit 120 includes, for example, a screw case 122, a drive motor 124, a flat screw 130, a barrel 140, and a heater 150. The plasticization unit 120 plasticizes a solid material supplied from the material supply unit 110, generates a pasted material having fluidity, and supplies the pasted material to the nozzle 160.

The term "plasticization" is a concept including melting, and refers to changing from a solid state to a state having fluidity. Specifically, for a material in which glass transition occurs, the plasticization refers to setting a temperature of the material to be equal to or higher than a glass transition point. For a material in which glass transition does not occur, the plasticization refers to setting the temperature of the material to a temperature equal to or higher than a melting point.

The screw case 122 is a housing that houses the flat screw 130. The barrel 140 is provided on a lower surface of the screw case 122. The flat screw 130 is housed in a space surrounded by the screw case 122 and the barrel 140.

The drive motor 124 is provided on an upper surface of the screw case 122. The drive motor 124 is, for example, a servomotor. A shaft 126 of the drive motor 124 is coupled to an upper surface 131 of the flat screw 130. The drive motor 124 is controlled by the control unit 90. Although not shown, the shaft 126 of the drive motor 124 and the upper surface 131 of the flat screw 130 may be coupled to each other via a speed reducer.

The flat screw 130 has a substantially cylindrical shape in which a size in a direction of a rotation axis R is smaller than a size in a direction orthogonal to the direction of the rotation axis R. In the illustrated example, the rotation axis R is parallel to the Z-axis. The flat screw 130 is rotated about the rotation axis R by a torque generated by the drive motor 124.

Figure 3:
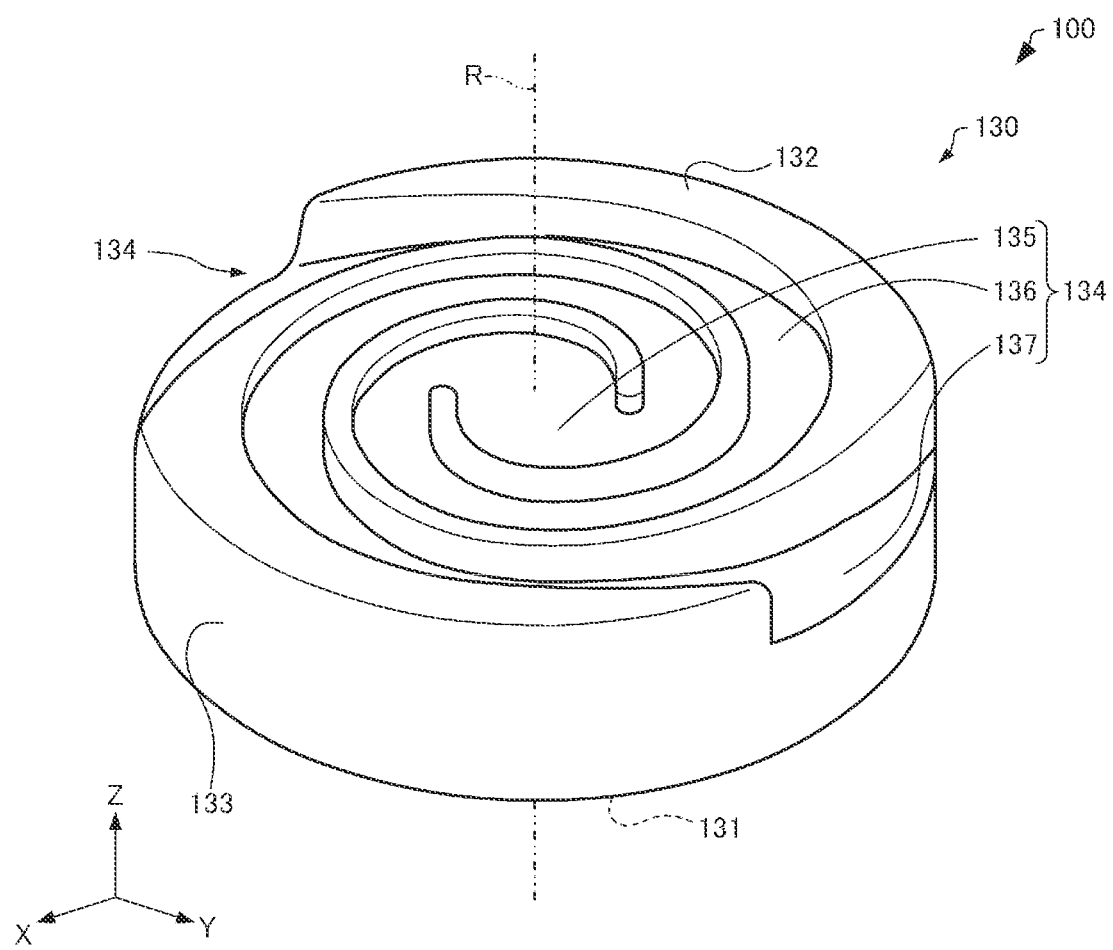
FIG. 3 is a perspective view schematically showing a flat screw of the three-dimensional shaping device according to the present embodiment.

The flat screw 130 has the upper surface 131, a groove forming surface 132 opposite to the upper surface 131, and a side surface 133 coupling the upper surface 131 and the groove forming surface 132. A first groove 134 is formed in the groove forming surface 132. The side surface 133 is, for example, perpendicular to the groove forming surface 132. Here, FIG. 3 is a perspective view schematically showing the flat screw 130. For convenience, FIG. 3 shows a state in which an up-down positional relationship is reversed from a state shown in FIG. 2.

As shown in FIG. 3, the first groove 134 is formed in the groove forming surface 132 of the flat screw 130. The first groove 134 includes, for example, a central portion 135, a coupling portion 136, and a material introduction portion 137. The central portion 135 faces a communication hole 146 formed in the barrel 140. The central portion 135 communicates with the communication hole 146. The coupling portion 136 couples the central portion 135 and the material introduction portion 137. In the illustrated example, the coupling portion 136 is provided in a spiral shape from the central portion 135 toward an outer periphery of the groove forming surface 132. The material introduction portion 137 is provided on the outer periphery of the groove forming surface 132. That is, the material introduction portion 137 is provided on the side surface 133 of the flat screw 130. The material supplied from the material supply unit 110 is introduced from the material introduction portion 137 into the first groove 134, passes through the coupling portion 136 and the central portion 135, and is conveyed to the communication hole 146 formed in the barrel 140. In the illustrated example, two first grooves 134 are provided.

The number of the first grooves 134 is not particularly limited. Although not shown, three or more first grooves 134 may be provided, or only one first groove 134 may be provided.

As shown in FIG. 2, the barrel 140 is provided below the flat screw 130. The barrel 140 has a facing surface 142 facing the groove forming surface 132 of the flat screw 130. The communication hole 146 communicating with the first groove 134 is formed at the center of the facing surface 142. Here, FIG. 4 is a plan view schematically showing the barrel 140.

Figure 4:
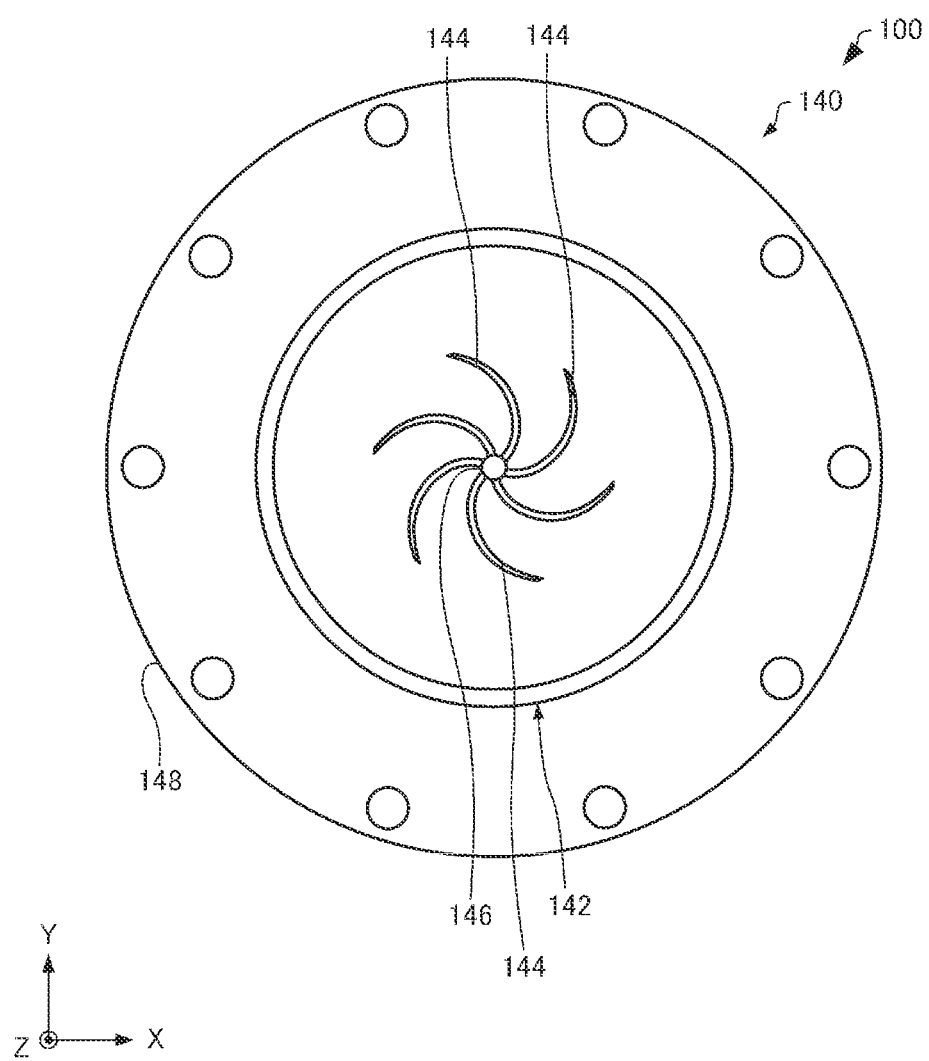
FIG. 4 is a plan view schematically showing a barrel of the three-dimensional shaping device according to the present embodiment.

As shown in FIG. 4, a second groove 144 and the communication hole 146 are formed in the facing surface 142 of the barrel 140. A plurality of the second grooves 144 are formed. In the illustrated example, six second grooves 144 are formed, but the number of the second grooves 144 is not particularly limited. The plurality of second grooves 144 are formed around the communication hole 146 when viewed from the Z-axis direction. One end of each of the plurality of second grooves 144 is coupled to the communication hole 146, and the second grooves 144 extend spirally from the communication hole 146 toward an outer periphery 148 of the barrel 140. The second grooves 144 have a function of guiding the plasticized material to the communication hole 146.

A shape of the second groove 144 is not particularly limited, and may be, for example, a linear shape. In addition, one end of the second groove 144 may not be coupled to the communication hole 146. Further, the second groove 144 may not be formed in the facing surface 142. However, in consideration of efficiently guiding the plasticized material to the communication hole 146, the second groove 144 is preferably formed in the facing surface 142.

As shown in FIG. 2, the heater 150 is provided in the barrel 140. The heater 150 is, for example, a bar heater. The heater 150 heats the material supplied between the flat screw 130 and the barrel 140. Output of the heater 150 is controlled by the control unit 90. The plasticization unit 120 generates the plasticized material by heating the material while conveying the material toward the communication hole 146 by using the flat screw 130, the barrel 140, and the heater 150, and causes the generated material to flow out from the communication hole 146. Although not shown, a shape of heater 150 may be a ring shape when viewed from the Z-axis direction.

The nozzle 160 is provided below the barrel 140. The nozzle 160 discharges the material supplied from the plasticization unit 120 toward the stage 20. The nozzle 160 is provided with a nozzle flow path 162. The nozzle flow path 162 communicates with the communication hole 146. The nozzle flow path 162 has a nozzle opening 164. The nozzle opening 164 is positioned at a front end of the nozzle 160. The material supplied from the communication hole 146 passes through the nozzle flow path 162 and is discharged from the nozzle opening 164.

As shown in FIGS. 1 and 2, the stage 20 is provided below the nozzle 160. In the illustrated example, a shape of the stage 20 is a rectangular parallelepiped. The stage 20 has a shaping region 22. The shaping region 22 is a region in which a layer made of the material discharged from the discharge units 10a, 10b is formed. The shaping region 22 is a region on an upper surface of the stage 20. The shaping region 22 is defined by positions of the nozzle openings 164 of the discharge units 10a, 10b. For example, when the stage 20 is moved in the X-axis direction and the Y-axis direction by the moving unit 30, an end of the shaping region 22 in the −X-axis direction is positioned below the nozzle opening 164 of the first discharge unit 10a when the stage 20 is moved most in the +X-axis direction. An end of the shaping region 22 in the +X-axis direction is positioned below the nozzle opening 164 of the second discharge unit 10b when the stage 20 is moved most in the −X-axis direction.

The moving unit 30 moves the discharge units 10a, 10b and the heating unit 50 relative to the stage 20. In the illustrated example, the moving unit 30 moves the stage 20 in the X-axis direction and the Y-axis direction to change the relative positions of the discharge units 10a, 10b, the heating unit 50, and the stage 20 in the X-axis direction and the Y-axis direction. The moving unit 30 moves the heating unit 50 relative to the stage 20 in conjunction with the movement of the discharge units 10a, 10b relative to the stage 20 in the X-axis direction and the Y-axis direction. Further, the moving unit 30 moves the discharge units 10a, 10b in the Z-axis direction to change the relative positions between the discharge units 10a, 10b and the stage 20 in the Z-axis direction.

As shown in FIG. 1, the moving unit 30 includes, for example, a first electric actuator 32, a second electric actuator 34, a third electric actuator 36, and a fourth electric actuator 38. The first electric actuator 32 moves the stage 20 in the X-axis direction. The second electric actuator 34 moves the stage 20 in the Y-axis direction. The third electric actuator 36 moves the first discharge unit 10a in the Z-axis direction. The fourth electric actuator 38 moves the second discharge unit 10b in the Z-axis direction. The discharge units 10a, 10b are moved in the Z-axis direction independently of each other by the electric actuators 36, 38.

The moving unit 30 may have a configuration of moving the heating unit 50 in the Z-axis direction, or may not have a configuration of moving the heating unit 50 in the Z-axis direction. When the heating unit 50 is moved in the Z-axis direction, the moving unit 30 may include a fifth electric actuator, which is not shown, extending in the Z-axis direction, and may drive the fifth electric actuator to move the heating unit 50 in the Z-axis direction. For example, when the discharge units 10a, 10b are moved in the Z-axis direction during shaping, the moving unit 30 may move the heating unit 50 in the Z-axis direction in conjunction with the movement of the discharge units 10a, 10b in the Z-axis direction.

The first support unit 40a supports the first discharge unit 10a from a direction orthogonal to a discharge direction of the material. In the illustrated example, the discharge direction of the material is the Z-axis direction. The direction orthogonal to the discharge direction of the material is the Y-axis direction. The first support unit 40a is fixed to the third electric actuator 36. The second support unit 40b supports the second discharge unit 10b from the Y-axis direction. The second support unit 40b is fixed to the fourth electric actuator 38.

Each of the first support unit 40a and the second support unit 40b includes, for example, a support plate 42 and a protruding portion 44. The first support unit 40a and the second support unit 40b basically have the same configuration.

The support plate 42 is, for example, a plate-shaped member. In the illustrated example, the support plate 42 has a main surface parallel to the XZ plane. The support plate 42 of the first support unit 40a is fixed to the third electric actuator 36. The support plate 42 of the second support unit 40b is fixed to the fourth electric actuator 38.

The protruding portion 44 protrudes in the Y-axis direction from the main surface of the support plate 42. The protruding portion 44 of the first support unit 40a is coupled to the first discharge unit 10a. The moving unit 30 moves the first discharge unit 10a in the Z-axis direction by driving the third electric actuator 36 to move the first support unit 40a in the Z-axis direction. The protruding portion 44 of the second support unit 40b is coupled to the second discharge unit 10b. The moving unit 30 moves the second discharge unit 10b in the Z-axis direction by driving the fourth electric actuator 38 to move the second support unit 40b in the Z-axis direction.

The heating unit 50 heats the shaping region 22 of the stage 20. A layer made of the material discharged from the nozzle 160 is formed in the shaping region 22. The layer is heated by the heating unit 50. A shape of the heating unit 50 is, for example, a substantially plate shape. The heating unit 50 includes a heater. The heating unit 50 has a shape covering the shaping region 22 when viewed from the Z-axis direction. When viewed from the Z-axis direction, the shaping region 22 overlaps the heating unit 50. When viewed from the Z-axis direction, an area of the heating unit 50 is larger than an area of the shaping region 22.

As shown in FIG. 2, during shaping in which the three-dimensional shaping device 100 shapes a shaped object, the heating unit 50 is positioned above the nozzle opening 164 of the nozzle 160 and below the cleaning mechanisms 60a, 60b. In the illustrated example, the "above" is the +Z-axis direction, and the "below" is the −Z-axis direction.

The heating unit 50 is provided with a first through hole 50a and a second through hole 50b. The through holes 50a, 50b penetrate the heating unit 50 in the Z-axis direction. When shaping is performed by the first discharge unit 10a, the nozzle 160 of the first discharge unit 10a is positioned in the first through hole 50a, and the nozzle opening 164 is positioned below the heating unit 50. When shaping is performed by the second discharge unit 10b, the nozzle 160 of the second discharge unit 10b is positioned in the second through hole 50b, and the nozzle opening 164 is positioned below the heating unit 50.

Figure 5:
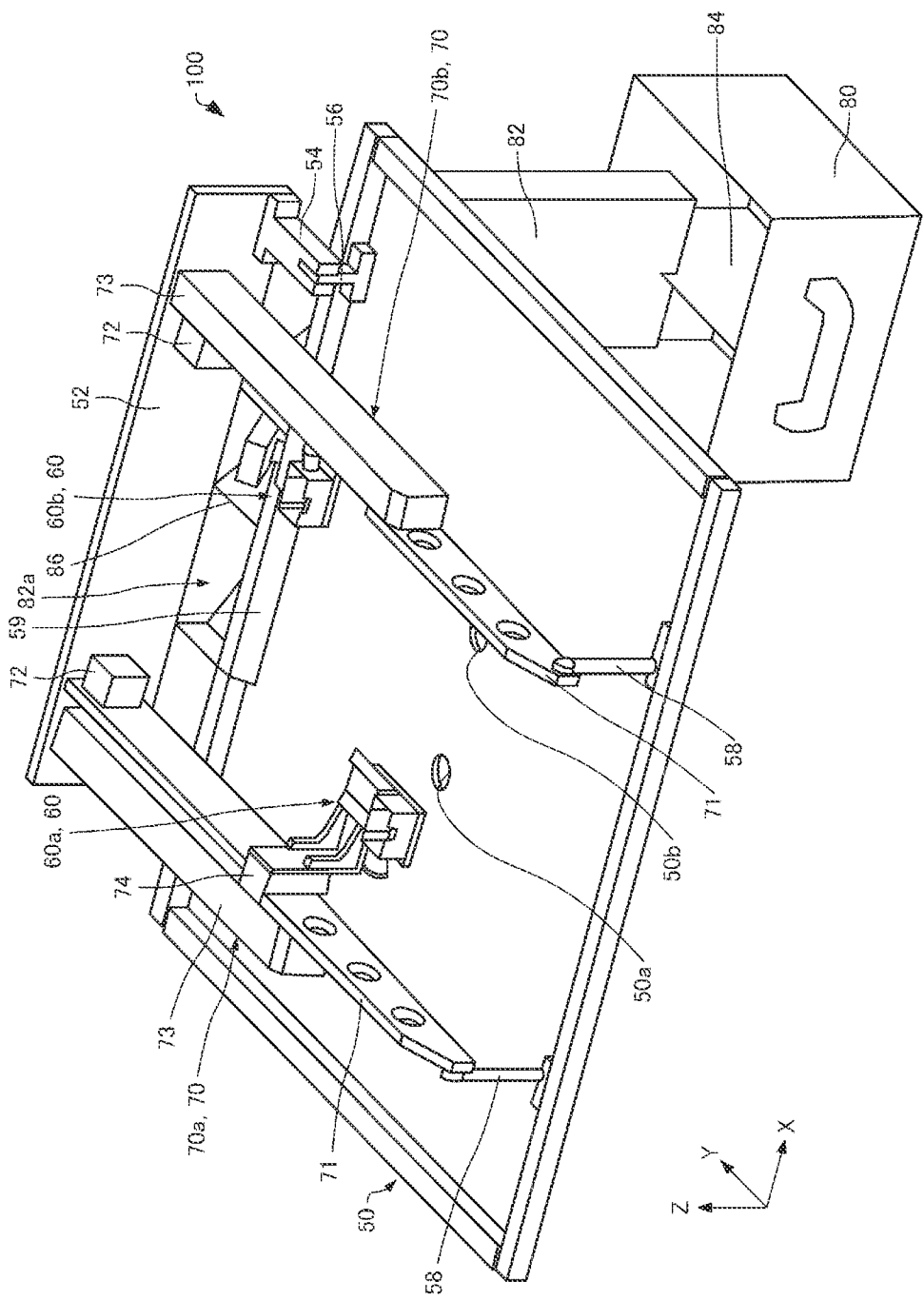
FIG. 5 is a perspective view schematically showing the three-dimensional shaping device according to the present embodiment.
Figure 6:
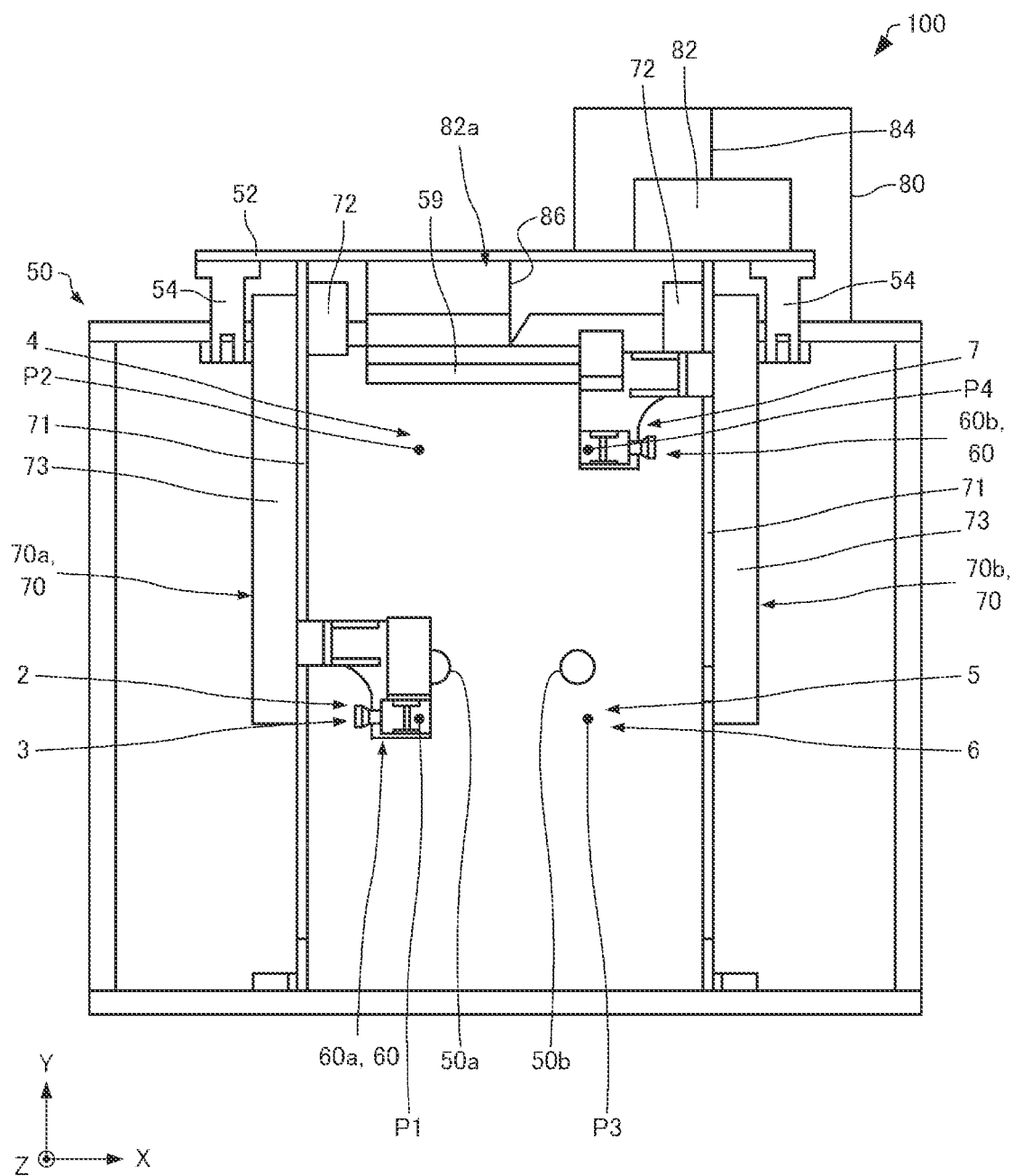
FIG. 6 is a plan view schematically showing the three-dimensional shaping device according to the present embodiment.
Figure 7:
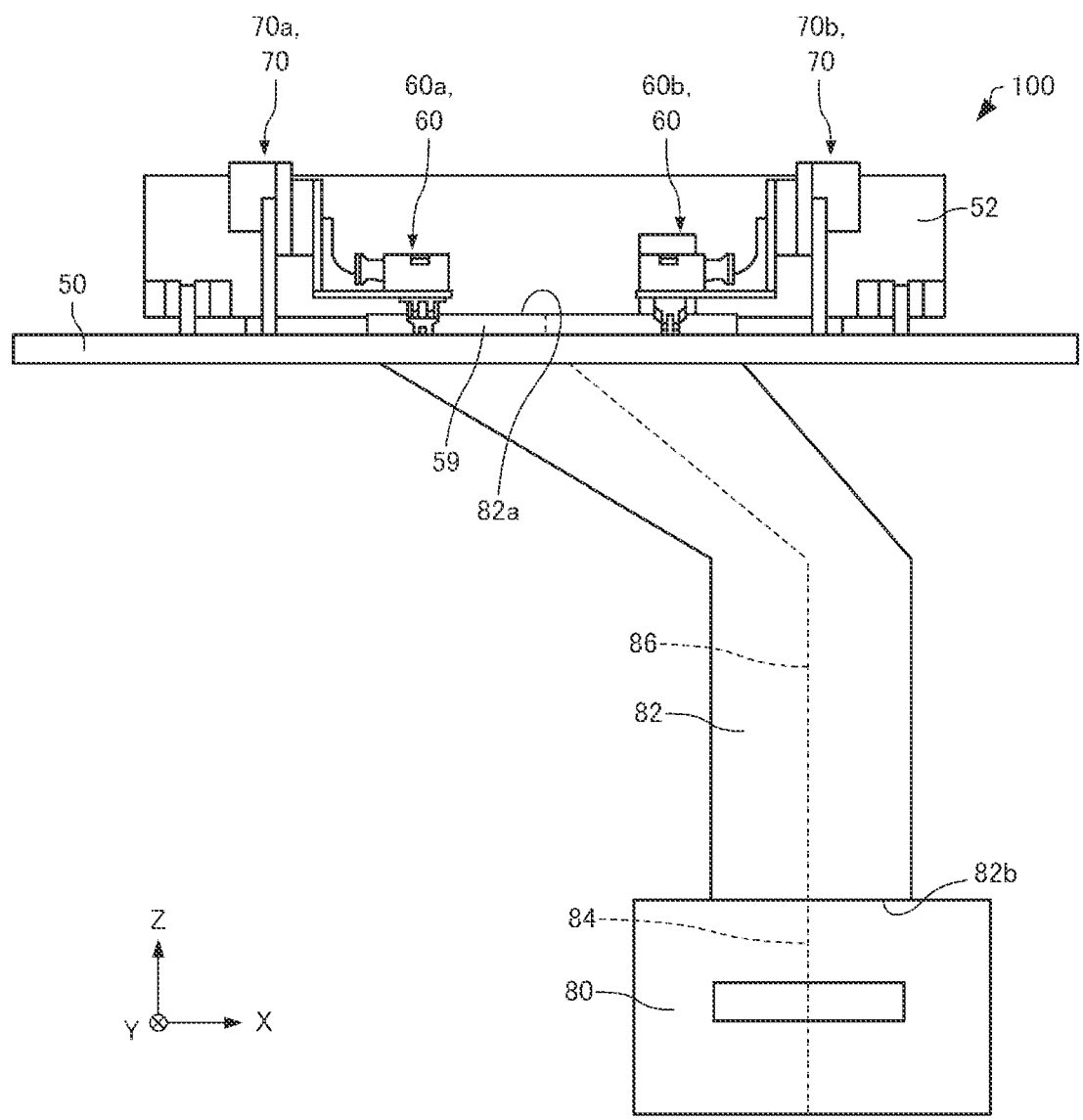
FIG. 7 is a side view schematically showing the three-dimensional shaping device according to the present embodiment.

Here, FIG. 5 is a perspective view schematically showing the three-dimensional shaping device 100. FIG. 6 is a plan view schematically showing the three-dimensional shaping device 100. FIG. 7 is a side view schematically showing the three-dimensional shaping device 100. For convenience, in FIGS. 5 to 7, the discharge units 10a, 10b, the stage 20, the moving unit 30, and the support units 40a, 40b are not shown.

As shown in FIG. 5, the heating unit 50 is supported by a base portion 52 via a beam portion 54 and a first suspension portion 56. The base portion 52 is supported by, for example, a support body (not shown). The base portion 52 is, for example, a plate-shaped member. For example, two beam portions 54 are provided. The beam portion 54 protrudes from the base portion 52 in the −Y-axis direction. The first suspension portion 56 is provided at a front end of the beam portion 54. The first suspension portion 56 suspends and supports the heating unit 50. Further, the heating unit 50 is supported by second suspension portions 58 provided at front ends of the cleaning moving units 70a, 70b.

The first cleaning mechanism 60a cleans the nozzle 160 of the first discharge unit 10a. The first cleaning mechanism 60a cleans the nozzle 160 of the first discharge unit 10a, for example, during shaping by the second discharge unit 10b. The second cleaning mechanism 60b cleans the nozzle 160 of the second discharge unit 10b. The second cleaning mechanism 60b cleans the nozzle 160 of the second discharge unit 10b, for example, during shaping by the first discharge unit 10a.

The first cleaning mechanism 60a and the second cleaning mechanism 60b are moved by the moving unit 30. The moving unit 30 moves the discharge units 10a, 10b and the cleaning mechanisms 60a, 60b relative to the stage 20. Specifically, the moving unit 30 drives the electric actuators 32, 34 to move the stage 20, thereby moving the discharge units 10a, 10b and the cleaning mechanisms 60a, 60b relative to the stage 20. The moving unit 30 moves the cleaning mechanisms 60a, 60b relative to the stage 20 in conjunction with the movement of the discharge units 10a, 10b relative to the stage 20. Specifically, when the discharge units 10a, 10b are moved relative to the stage 20 in the X-axis direction and the Y-axis direction, the moving unit 30 moves the cleaning mechanisms 60a, 60b relative to the stage 20 in conjunction with the movement of the discharge units 10a, 10b relative to the stage 20. Further, the moving unit 30 drives the electric actuators 36, 38 to move the cleaning mechanisms 60a, 60b in the Z-axis direction.

When the first cleaning mechanism 60a cleans the nozzle 160 of the first discharge unit 10a, the moving unit 30 drives the third electric actuator 36 to move the nozzle opening 164 of the first discharge unit 10a above the heating unit 50. When the second cleaning mechanism 60b cleans the nozzle 160 of the second discharge unit 10b, the moving unit 30 drives the fourth electric actuator 38 to move the nozzle opening 164 of the second discharge unit 10b above the heating unit 50.

Figure 8:
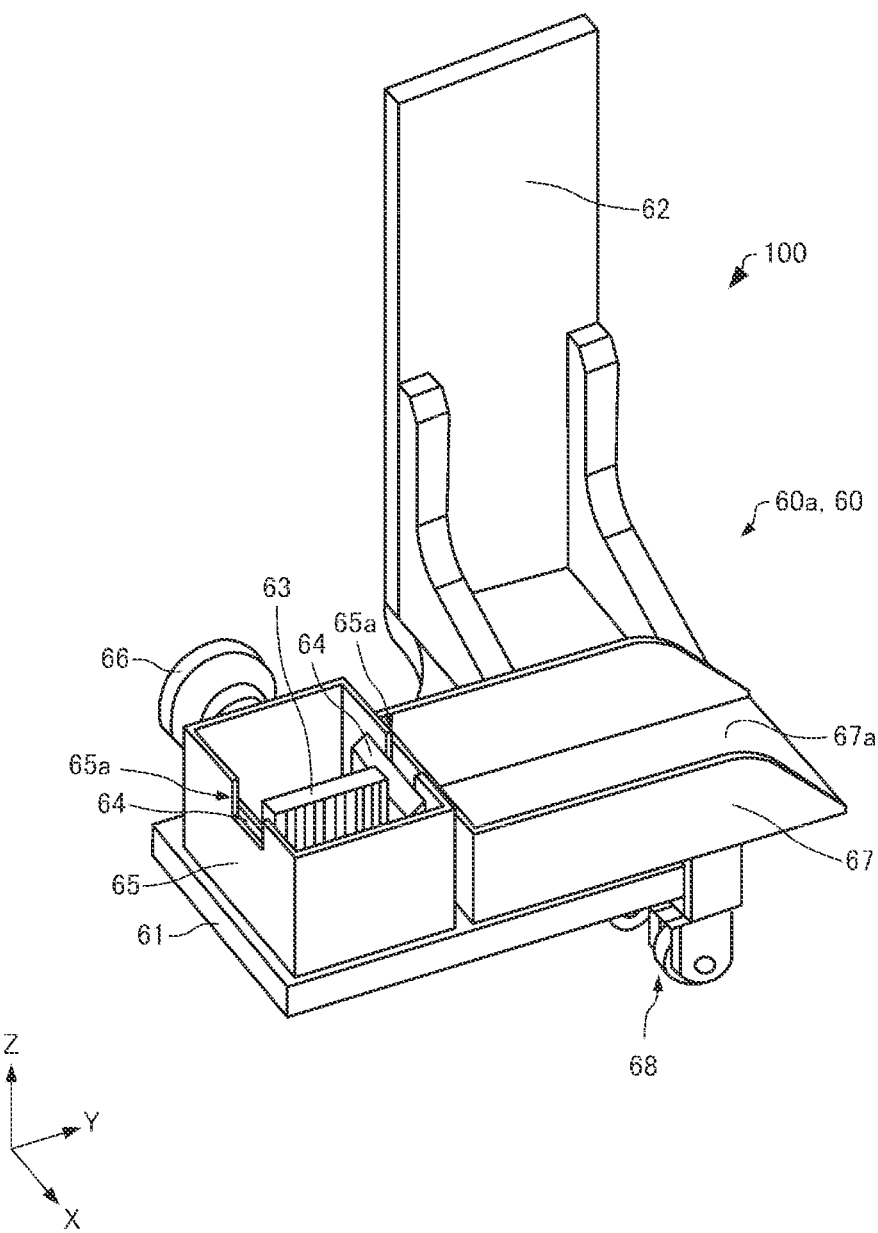
FIG. 8 is a perspective view schematically showing a first cleaning mechanism of the three-dimensional shaping device according to the present embodiment.
Figure 9:
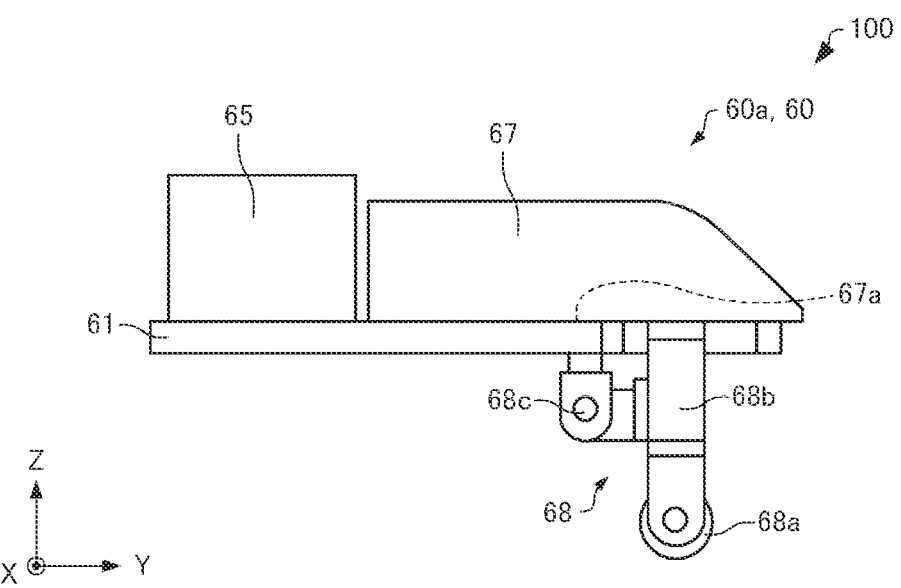
FIG. 9 is a side view schematically showing the first cleaning mechanism of the three-dimensional shaping device according to the present embodiment.
Figure 10:
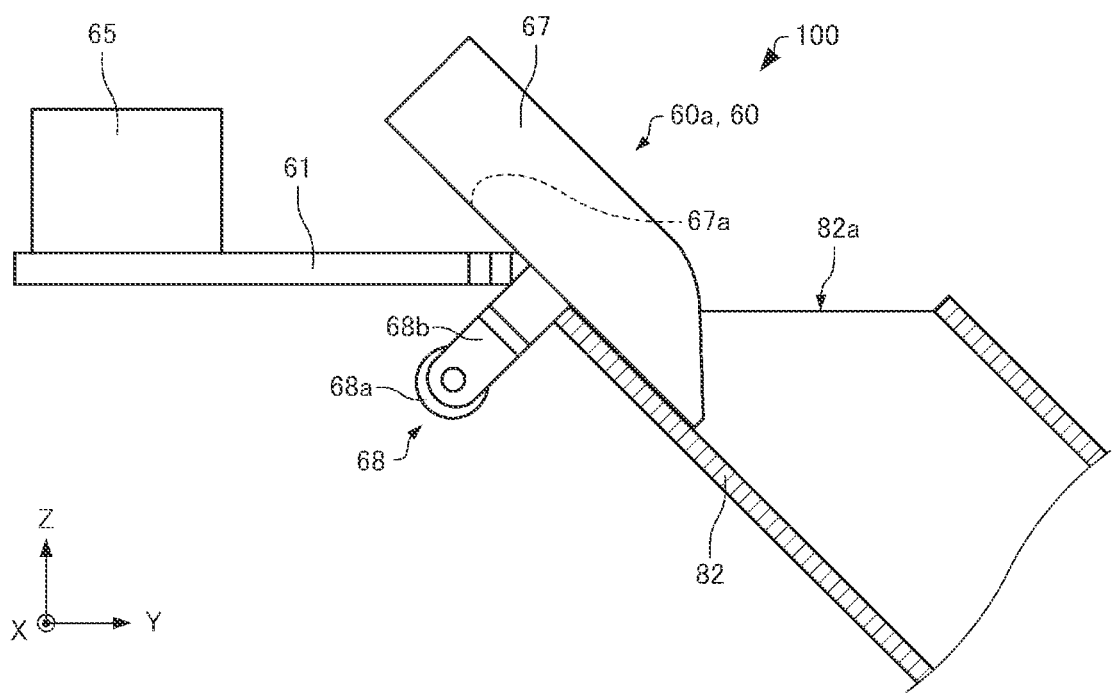
FIG. 10 is a side view schematically showing the first cleaning mechanism of the three-dimensional shaping device according to the present embodiment.

The first cleaning mechanism 60a is supported by the first cleaning moving unit 70a. The second cleaning mechanism 60b is supported by the second cleaning moving unit 70b. Here, FIG. 8 is a perspective view schematically showing the first cleaning mechanism 60a. FIGS. 9 and 10 are side views schematically showing the first cleaning mechanism 60a.

As shown in FIG. 8, each of the first cleaning mechanism 60a and the second cleaning mechanism 60b includes, for example, a substrate 61, a side plate 62, a brush unit 63, a blade plate 64, a cleaning case 65, a grip portion 66, a purge unit 67, and a discharge mechanism 68. The first cleaning mechanism 60a and the second cleaning mechanism 60b basically have the same configuration. For convenience, the side plate 62 is not shown in FIGS. 9 and 10.

The substrate 61 is, for example, a plate-shaped member. In the illustrated example, the substrate 61 has a main surface parallel to the XY plane. The main surface is an upper surface of the substrate 61. The cleaning case 65 and the purge unit 67 are provided on the upper surface of the substrate 61.

The side plate 62 is coupled to the substrate 61. The side plate 62 is, for example, a plate-shaped member. In the illustrated example, the side plate 62 has a main surface parallel to the YZ plane. The side plate 62 may be provided integrally with the substrate 61. The side plate 62 of the first cleaning mechanism 60a couples the substrate 61 and the first cleaning moving unit 70a. The side plate 62 of the second cleaning mechanism 60b couples the substrate 61 and the second cleaning moving unit 70b.

The brush unit 63 is housed in the cleaning case 65. The brush unit 63 includes a brush that comes into contact with the nozzle 160. In the illustrated example, the brush unit 63 has a shape in which the Y-axis direction is a longitudinal direction. The brush unit 63 comes into contact with the nozzle 160 and is capable of reciprocating little by little in the Y-axis direction by the driving of the cleaning moving units 70a, 70b. The cleaning mechanisms 60a, 60b can clean the nozzles 160 by the brush units 63.

The blade plate 64 is housed in the cleaning case 65. In the illustrated example, a pair of the blade plates 64 are provided so as to sandwich the brush unit 63 in the Y-axis direction. A front end of the blade plate 64 is a blade surface inclined with respect to the XZ plane. In the illustrated example, the front end of the blade plate 64 is an end in the +Z-axis direction. The cleaning case 65 is provided with a notch 65a. The cleaning case 65 is implemented such that the front end of the blade plate 64 can be seen when viewed from the Y-axis direction. The blade plate 64 is moved in the Y-axis direction by the driving of the cleaning moving units 70a, 70b, and can, for example, cut a residue of a resin extending downward without being separated from the nozzle 160. The cleaning mechanisms 60a, 60b clean the nozzles 160 by the brush units 63 after cutting the residue by the blade plates 64.

The cleaning case 65 has, for example, a shape of which an upper side is opened. The cleaning case 65 can accumulate the residue of the resin discharged from the nozzle 160 by the cleaning of the brush unit 63 and the residue cut by the blade plate 64.

The grip portion 66 is coupled to the cleaning case 65. In the illustrated example, the grip portion 66 protrudes from the cleaning case 65 in the X-axis direction. The cleaning case 65 is detachably attached to the substrate 61. A user can remove the cleaning case 65 from the substrate 61 by gripping the grip portion 66 and discard the residue accumulated in the cleaning case 65.

The purge unit 67 is provided, for example, in the +Y-axis direction of the cleaning case 65. The purge unit 67 has a substantially box shape of which an upper side and a side in the +Y-axis direction are opened. The material is purged from the nozzle 160 and accumulated in the purge unit 67. Specifically, when the shaping of the shaped object is started, since the material used in the previous shaping remains in the nozzle 160, the discharge units 10a, 10b discharge the material as the residue toward the purge unit 67. The purge unit 67 receives the discharged residue.

The discharge mechanism 68 is provided below the substrate 61. The discharge mechanism 68 is a mechanism that discharges the material accumulated in the purge unit 67 to the collection box 80. Specifically, the discharge mechanism 68 causes the material accumulated on a bottom surface 67a to slide and discharges the material to the collection box 80 by inclining the bottom surface 67a of the purge unit 67 with respect to the upper surface of the substrate 61.

The bottom surface 67a may be subjected to a fluorine coating process or a polishing process. Although not shown, an actuator that vibrates the bottom surface 67a may be provided. By such a process or vibration, the accumulated material can easily slip on the bottom surface 67a.

As shown in FIGS. 9 and 10, the discharge mechanism 68 includes, for example, a roller 68a provided below the substrate 61, a support shaft portion 68b coupling the roller 68a and the substrate 61, and a spring portion 68c coupling the support shaft portion 68b and the substrate 61.

When the nozzle 160 is cleaned and when the material is purged from the nozzle 160, the discharge mechanism 68 keeps the bottom surface 67a of the purge unit 67 parallel to the upper surface of the substrate 61, as shown in FIGS. 8 and 9. When the material accumulated in the purge unit 67 is discharged to the collection box 80, the cleaning mechanisms 60a, 60b are moved in the +Y-axis direction by the driving of the cleaning moving units 70a, 70b until the cleaning mechanisms 60a, 60b come into contact with a stopper 59 shown in FIG. 5. The stopper 59 is provided in the heating unit 50. As shown in FIG. 10, when the roller 68a comes into contact with the stopper 59, the movement of the roller 68a in the +Y-axis direction is stopped, and the support shaft portion 68b is inclined with respect to the Z-axis. In accordance with the movement of the support shaft portion 68b, the bottom surface 67a of the purge unit 67 is inclined. Then, the accumulated material is discharged to the collection box 80. In a state in which the discharge mechanism 68 is separated from the stopper 59, as shown in FIG. 9, the bottom surface 67a of the purge unit 67 is kept parallel to the upper surface of the substrate 61 by an action of the spring portion 68c.

The first cleaning moving unit 70a moves the first cleaning mechanism 60a. The first cleaning mechanism 60a is moved by the first cleaning moving unit 70a to clean the nozzle 160 of the first discharge unit 10a. The second cleaning moving unit 70b moves the second cleaning mechanism 60b. The second cleaning mechanism 60b is moved by the second cleaning moving unit 70b to clean the nozzle 160 of the second discharge unit 10b.

As shown in FIG. 6, the first cleaning moving unit 70a moves the first cleaning mechanism 60a to a first position P1 where the first cleaning mechanism 60a overlaps the nozzle opening 164 and a second position P2 where the first cleaning mechanism 60a does not overlap the nozzle opening 164 when viewed from the Z-axis direction. The first cleaning moving unit 70a cleans the nozzle 160 at the first position P1, and does not clean the nozzle 160 at the second position P2. The first cleaning moving unit 70a moves the first cleaning mechanism 60a to a first region 3 including a region 2 overlapping the nozzle opening 164 and a second region 4 not overlapping the nozzle opening 164 when viewed from the Z-axis direction. The first cleaning moving unit 70a cleans the nozzle 160 in the first region 3, and does not clean the nozzle 160 in the second region 4. The first region 3 includes the first position P1. The second region 4 includes the second position P2. In the illustrated example, the second position P2 is positioned in the +Y-axis direction of the first position P1. When the first discharge unit 10a is positioned at the second position P2, the first discharge unit 10a is in contact with the stopper 59. The second position P2 is a position closer to the support plate 42 shown in FIG. 1 than the first discharge unit 10a. The second region 4 is a region closer to the support plate 42 than the first discharge unit 10a. The discharge mechanism 68 of the first cleaning mechanism 60a discharges the material accumulated in the purge unit 67 to the collection box 80 at the second position P2. The discharge mechanism 68 of the first cleaning mechanism 60a discharges the material accumulated in the purge unit 67 to the collection box 80 in the second region 4.

As shown in FIG. 6, the second cleaning moving unit 70b moves the second cleaning mechanism 60b to a third position P3 where the second cleaning mechanism 60b overlaps the nozzle opening 164 and a fourth position P4 where the second cleaning mechanism 60b does not overlap the nozzle opening 164 when viewed from the Z-axis direction. The second cleaning moving unit 70b cleans the nozzle 160 at the third position P3, and does not clean the nozzle 160 at the fourth position P4. The second cleaning moving unit 70b moves the second cleaning mechanism 60b to a third region 6 including a region 5 overlapping the nozzle opening 164 and a fourth region 7 not overlapping the nozzle opening 164 when viewed from the Z-axis direction. The second cleaning moving unit 70b cleans the nozzle 160 in the third region 6, and does not clean the nozzle 160 in the fourth region 7. The third region 6 includes the third position P3. The fourth region 7 includes the fourth position P4. In the illustrated example, the fourth position P4 is positioned in the +Y-axis direction of the third position P3. When the second discharge unit 10b is positioned at the fourth position P4, the second discharge unit 10b is in contact with the stopper 59. The fourth position P4 is a position closer to the support plate 42 shown in FIG. 1 than the second discharge unit 10b. The fourth region 7 is a region closer to the support plate 42 than the first discharge unit 10a. The discharge mechanism 68 of the second cleaning mechanism 60b discharges the material accumulated in the purge unit 67 to the collection box 80 at the fourth position P4. In the example shown in FIGS. 5 and 6, the first cleaning mechanism 60a is positioned at the first position P1. The second cleaning mechanism 60b is positioned at the fourth position P4. The discharge mechanism 68 of the second cleaning mechanism 60b discharges the material accumulated in the purge unit 67 to the collection box 80 in the fourth region 7.

As shown in FIGS. 5 and 6, each of the first cleaning moving unit 70a and the second cleaning moving unit 70b includes, for example, a support beam 71, a drive unit 72, a drive box 73, and a coupling member 74. The first cleaning moving unit 70a and the second cleaning moving unit 70b basically have the same configuration.

The support beam 71 is fixed to the base portion 52. In the illustrated example, the support beam 71 protrudes from the base portion 52 in the −Y-axis direction. The second suspension portion 58 that supports the heating unit 50 is provided at a front end of the support beam 71. The support beam 71 is formed with through holes penetrating the support beam 71 in the X-axis direction. The through hole can reduce the weight of the support beam 71.

The drive unit 72 drives a pulley housed in the drive box 73. When the coupling member 74 is moved in the Y-axis direction by the driving of the pulley, the cleaning mechanisms 60a, 60b are moved in the Y-axis direction. The drive unit 72 of the first cleaning moving unit 70a is provided in the +X-axis direction of the support beam 71. The drive unit 72 of the second cleaning moving unit 70b is provided in the −X-axis direction of the support beam 71. The drive unit 72 is implemented by, for example, a stepping motor.

The drive box 73 houses a pulley driven by the drive unit 72. The drive box 73 of the first cleaning moving unit 70a is provided in the −X-axis direction of the support beam 71. The drive box 73 of the second cleaning moving unit 70b is provided in the +X-axis direction of the support beam 71.

The coupling member 74 couples the drive box 73 and the side plate 62. When a force generated by the pulley is transmitted to the coupling member 74, the coupling member 74 moves in the Y-axis direction. As the coupling member 74 moves, the cleaning mechanisms 60a, 60b move in the Y-axis direction.

As shown in FIGS. 5 and 7, the collection box 80 is provided below the heating unit 50. The material accumulated in the purge unit 67 is discharged to the collection box 80. The material discharged to the collection box 80 is, for example, collected and reused.

The collection box 80 is coupled to the stopper 59 via a duct 82. An inlet 82a is provided at a portion of the duct 82 coupled to the stopper 59. An outlet 82b is provided at a portion of the duct 82 coupled to the collection box 80. The material accumulated in the purge unit 67 passes through the duct 82 from the inlet 82a, and is discharged to the collection box 80 from the outlet 82b.

The collection box 80 is provided with a first partition plate 84. Two spaces are defined in the collection box 80 by the first partition plate 84. As shown in FIG. 7, the duct 82 is provided with a second partition plate 86. Two spaces are defined in the duct 82 by the second partition plate 86. The material accumulated in the purge unit 67 of the first cleaning mechanism 60a passes through one space in the duct 82 defined by the second partition plate 86, and is discharged to one space in the collection box 80 defined by the first partition plate 84. The material accumulated in the purge unit 67 of the second cleaning mechanism 60b passes through the other space in the duct 82 defined by the second partition plate 86, and is discharged to the other space in the collection box 80 defined by the first partition plate 84.

Accordingly, the material accumulated in the first cleaning mechanism 60a and the material accumulated in the second cleaning mechanism 60b can be separately collected by the first partition plate 84 and the second partition plate 86. Therefore, even if the material accumulated in the first cleaning mechanism 60a and the material accumulated in the second cleaning mechanism 60b are different materials, the materials can be easily reused.

The control unit 90 is implemented by, for example, a computer including a processor, a main storage device, and an input and output interface that inputs and outputs a signal from and to the outside. The control unit 90 exerts various functions, for example, by the processor executing a program read into the main storage device. Specifically, the control unit 90 controls the discharge units 10a, 10b, the moving unit 30, and the cleaning moving units 70a, 70b. The control unit 90 may be implemented by a combination of a plurality of circuits instead of a computer.

1.2. Processing of Control Unit

Figure 11:
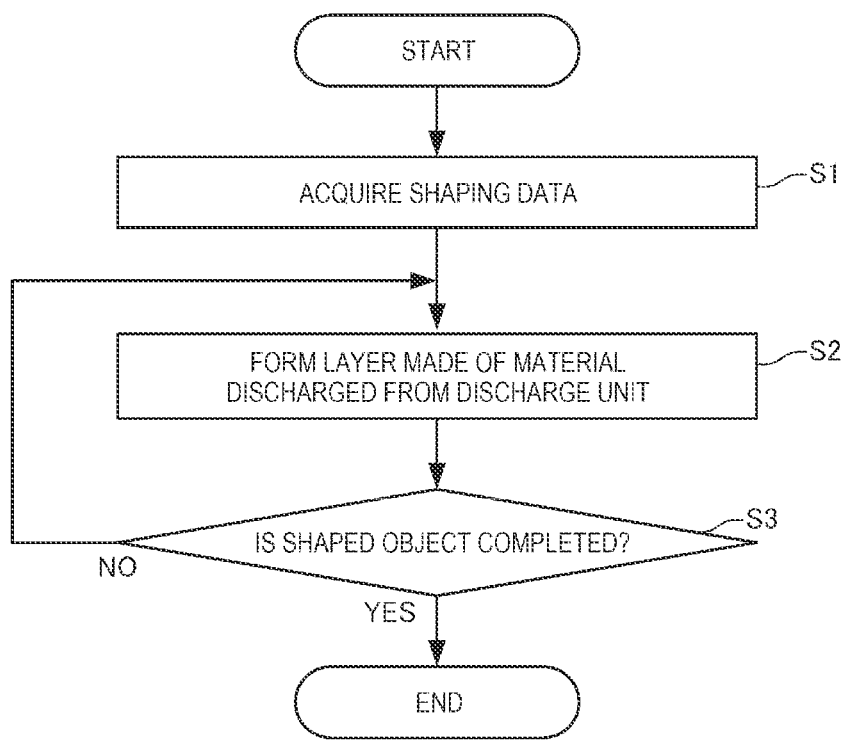
FIG. 11 is a flowchart for showing processing of a control unit of the three-dimensional shaping device according to the present embodiment.

FIG. 11 is a flowchart showing processing of the control unit 90.

For example, the user operates an operation unit (not shown) to output, to the control unit 90, a processing start signal for starting processing. The operation unit is implemented by, for example, a mouse, a keyboard, and a touch panel. When the processing start signal is received, the control unit 90 starts the processing.

First, as shown in FIG. 11, as step S1, the control unit 90 performs processing of acquiring shaping data for shaping a three-dimensional shaped object. The shaping data includes information on a movement path of the nozzle 160 with respect to the stage 20, an amount of the material discharged from the nozzle 160, and the like. The shaping data is created by, for example, causing a slicer software, which is installed in a computer connected to the three-dimensional shaping device 100, to read shape data. The shape data is data representing a target shape of the three-dimensional shaped object created using three-dimensional computer aided design (CAD) software, three-dimensional computer graphics (CG) software, and the like. As the shape data, for example, data in a standard triangulated language (STL) format or an additive manufacturing file format (AMF) is used. The slicer software divides the target shape of the three-dimensional shaped object into layers having a predetermined thickness, and creates shaping data for each layer. The shaping data is represented by a G code, an M code, and the like. The control unit 90 acquires the shaping data from the computer connected to the three-dimensional shaping device 100 or a recording medium such as a universal serial bus (USB) memory.

Next, as step S2, the control unit 90 controls the discharge units 10a, 10b, the moving unit 30, and the cleaning moving units 70a, 70b based on the shaping data to perform the processing of forming a layer made of the material discharged from the discharge units 10a, 10b in the shaping region 22 of the stage 20.

Specifically, the control unit 90 controls the first discharge unit 10a to purge the residue of the nozzle 160 of the first discharge unit 10a. The first cleaning mechanism 60a is positioned at the first position P1. Next, the control unit 90 controls the first cleaning moving unit 70a to move the first cleaning mechanism 60a to the second position P2. Next, the control unit 90 controls the moving unit 30 to position the nozzle opening 164 of the first discharge unit 10a below the heating unit 50. Next, the control unit 90 controls the moving unit 30 to move the first discharge unit 10a relative to the stage 20, controls the plasticization unit 120 of the first discharge unit 10a to discharge the generated material from the nozzle opening 164 toward the stage 20, and forms a layer in the shaping region 22.

When the processing of discharging the material from the first discharge unit 10a is performed, the control unit 90 controls the second cleaning moving unit 70b to move the second cleaning mechanism 60b to the third position P3 and cause the second cleaning mechanism 60b to clean the nozzle 160 of the second discharge unit 10b. Next, the control unit 90 controls the second discharge unit 10b to purge the residue of the nozzle 160 of the second discharge unit 10b. Next, the control unit 90 controls the second cleaning moving unit 70b to move the second cleaning mechanism 60b to the fourth position P4. Next, the control unit 90 controls the moving unit 30 to position the nozzle opening 164 of the second discharge unit 10b below the heating unit 50. Next, the control unit 90 ends the discharge of the material from the first discharge unit 10a. Next, the control unit 90 controls the moving unit 30 to move the second discharge unit 10b relative to the stage 20, controls the plasticization unit 120 of the second discharge unit 10b to discharge the generated material from the nozzle opening 164 toward the shaping region 22 of the stage 20, and forms a layer in the shaping region 22.

When the processing of discharging the material from the second discharge unit 10b is performed, the control unit 90 controls the moving unit 30 to position the nozzle opening 164 of the first discharge unit 10a above the heating unit 50. Next, the control unit 90 controls the first cleaning moving unit 70a to move the first cleaning mechanism 60a to the first position P1 and clean the nozzle 160 of the first discharge unit 10a.

Next, as step S3, the control unit 90 performs processing of determining, based on the shaping data, whether the shaped object is completed. When it is determined that the shaped object is not completed, as "NO" shown in FIG. 11, the control unit 90 returns the processing to step S2. On the other hand, when it is determined that the shaped object is completed, as "YES" shown in FIG. 11, the control unit 90 ends the processing.

The materials discharged from the first discharge unit 10a and the second discharge unit 10b may be the same material or may be different materials. When the materials discharged from the discharge units 10a, 10b are different materials, the material discharged from the first discharge unit 10a may be a shaping material constituting the shaped object, and the material discharged from the second discharge unit 10b may be a support material for supporting the shaped object. The support material is removed after the shaped object is shaped. Alternatively, when the materials discharged from the discharge units 10a, 10b are different materials, the materials discharged from the discharge units 10a, 10b may both be shaping materials constituting the shaped object.

In addition, in the above description, an example in which two discharge units 10 are provided is described, but the number of the discharge units 10 is not particularly limited. The number of the cleaning mechanisms 60 and the number of the cleaning moving units 70 are the same as the number of the discharge units 10.

1.3. Function and Effect

The three-dimensional shaping device 100 includes the first discharge unit 10a that includes the nozzle 160 and discharges the material toward the stage 20, the first cleaning mechanism 60a that cleans the nozzle 160, and the moving unit 30 that moves the first discharge unit 10a and the cleaning mechanism 60a relative to the stage 20. The moving unit 30 moves the first cleaning mechanism 60a relative to the stage 20 in conjunction with the movement of the first discharge unit 10a relative to the stage 20. Therefore, in the three-dimensional shaping device 100, it is possible to reduce a moving distance of the cleaning mechanism 60 when cleaning the nozzle 160, as compared with when the cleaning mechanism does not move in conjunction with the movement of the discharge unit relative to the stage.

In the three-dimensional shaping device 100, the first cleaning mechanism 60a includes the purge unit 67 that purges the material from the nozzle 160, and the brush unit 63 including the brush that comes into contact with the nozzle 160. Therefore, the first cleaning mechanism 60a can receive the material purged by the purge unit 67 and clean the nozzle 160 by the brush unit 63.

The three-dimensional shaping device 100 includes the first cleaning moving unit 70a that moves the first cleaning mechanism 60a. The first cleaning mechanism 60a is moved by the first cleaning moving unit 70a to clean the nozzle 160. Therefore, in the three-dimensional shaping device 100, it is possible to prevent, by the cleaning of the nozzle, accuracy of the object to be shaped from being deteriorated, as compared with when the nozzle is cleaned by moving the discharge unit. For example, when the nozzle is cleaned by moving the discharge unit in the X-axis direction and the Y-axis direction, a residue in the discharge unit may drop and adhere to the shaped object during the movement of the discharge unit, and the accuracy of the shaped object may deteriorate.

In the three-dimensional shaping device 100, the first cleaning moving unit 70a moves the first cleaning mechanism 60a to the first region 3 including the region 2 overlapping the nozzle opening 164 of the nozzle 160 and the second region 4 not overlapping the nozzle opening 164 of the nozzle 160 when viewed from the discharge direction of the material. The first cleaning mechanism 60a cleans the nozzle 160 in the first region 3 and does not clean the nozzle 160 in the second region 4. Therefore, in the three-dimensional shaping device 100, the first cleaning mechanism 60a can be moved to the second region 4 when the first discharge unit 10a discharges the material, and the first cleaning mechanism 60a does not interfere with the discharge of the first discharge unit 10a.

The three-dimensional shaping device 100 includes the first support unit 40a that supports the first discharge unit 10a from a direction orthogonal to the discharge direction of the material. The first support unit 40a includes the support plate 42 and the protruding portion 44 that protrudes from the support plate 42 in the direction orthogonal to the discharge direction of the material and is coupled to the first discharge unit 10a. The second region 4 is a region closer to the support plate 42 than the first discharge unit 10a. Therefore, in the three-dimensional shaping device 100, when the user performs maintenance or replacement of the first discharge unit 10a, the first cleaning mechanism 60a does not interfere. The user usually performs maintenance or replacement of the first discharge unit 10a from the side opposite to the support plate 42 side of the first discharge unit 10a. In the three-dimensional shaping device 100, the first cleaning mechanism 60a includes the discharge mechanism 68 that discharges the material accumulated in the purge unit 67 to the collection box 80 in the second region 4. Therefore, in the three-dimensional shaping device 100, when the first cleaning mechanism 60a is moved to the second region 4, it is possible to automatically discharge the accumulated material to the collection box 80 by the discharge mechanism 68.

The three-dimensional shaping device 100 includes the heating unit 50 that heats the shaping region 22 of the stage 20. The heating unit 50 is positioned above the position of the nozzle opening 164 of the nozzle 160 and below the first cleaning mechanism 60a during shaping. A layer made of the material discharged from the first discharge unit 10a is formed in the shaping region 22. When viewed from the discharge direction of the material, the heating unit 50 has a shape covering the shaping region 22. The moving unit 30 moves the heating unit 50 relative to the stage 20 in conjunction with the movement of the first discharge unit 10a relative to the stage 20. Therefore, in the three-dimensional shaping device 100, when the material is discharged toward a first layer formed in the shaping region 22 to form a second layer, adhesion between the first layer and the second layer can be increased by the heating of the heating unit 50.

In the three-dimensional shaping device 100, when the first cleaning mechanism 60a cleans the nozzle 160, the moving unit 30 moves the nozzle opening 164 of the nozzle 160 above the heating unit 50. Therefore, in the three-dimensional shaping device 100, the heating unit 50 does not interfere when the first cleaning mechanism 60a cleans the nozzle 160.

The three-dimensional shaping device 100 includes the second discharge unit 10b. The first cleaning mechanism 60a cleans the nozzle 160 of the first discharge unit 10a during shaping by the second discharge unit 10b. Therefore, in the three-dimensional shaping device 100, it is possible to shorten a time for shaping the shaped object as compared with when the nozzle of the first discharge unit is not cleaned while the second discharge unit is being driven.

In the three-dimensional shaping device 100, the moving unit 30 moves the first discharge unit 10a and the first cleaning mechanism 60a in the Z-axis direction as a first direction parallel to the discharge direction of the material, and moves the stage 20 in the X-axis direction as a second direction orthogonal to the discharge direction of the material and in the Y-axis direction as a third direction orthogonal to the first direction and the second direction. Therefore, in the three-dimensional shaping device 100, it is possible to improve the accuracy of the object to be shaped, as compared with, for example, a case where the discharge unit and the cleaning mechanism are moved in the X-axis direction, the Y-axis direction, and the Z-axis direction. Since the discharge unit is particularly heavy, when the discharge unit is moved in the X-axis direction, the Y-axis direction, and the Z-axis direction, a position of the discharge unit relative to the stage is likely to be deviated from a predetermined position, and the accuracy of the shaped object may be deteriorated.

1.4. Material to be Supplied

Examples of the material supplied from the material supply unit 110 include materials having various materials such as a thermoplastic material, a metal material, and a ceramic material as main materials. Here, the "main material" means a material serving as a center forming the shape of the shaped object, and means a material having a content of 50 mass % or more in the shaped object. The materials described above include those acquired by melting these main materials alone, and those acquired by melting a part of components contained together with the main materials into a paste form.

As the thermoplastic material, for example, a thermoplastic resin can be used. Examples of the thermoplastic resin include: general-purpose engineering plastics such as acrylonitrile butadiene styrene (ABS) resin, polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate; and engineering plastics such as polysulfone, polyether sulfone, polyphenylene sulfide, polyarylate, polyimide, polyamideimide, polyetherimide, and polyether ether ketone (PEEK).

In addition to a pigment, a metal, and a ceramic, an additive such as a wax, a flame retardant, an antioxidant, and a heat stabilizer may be mixed into the thermoplastic material. In the plasticization unit 120, the thermoplastic material is plasticized and converted into a molten state by rotation of the flat screw 130 and heating of the heater 150. In addition, the plasticized material generated in this manner is injected from the nozzle 160 and then cured by a decrease in temperature. It is desirable that the thermoplastic material is heated to a temperature equal to or higher than a glass transition point thereof and injected from the nozzle 160 in a state of being completely melted.

In the plasticization unit 120, for example, a metal material may be used as the main material instead of the thermoplastic material described above. In this case, it is desirable that a powder material acquired by powdering the metal material is mixed with a component that melts when the plasticized material is generated, and the mixture is fed into the plasticization unit 120.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticization unit 120, a ceramic material can be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride.

A powder material of the metal material or the ceramic material supplied from the material supply unit 110 may be a mixed material in which a plurality of types of powder of a single metal or powder of an alloy and powder of a ceramic material are mixed. In addition, the powder material of the metal material or the ceramic material may be coated with, for example, the above-described thermoplastic resin or another thermoplastic resin. In this case, in the plasticization unit 120, the thermoplastic resin may be melted to exhibit fluidity.

For example, a solvent can be added to the powder material of the metal material or the ceramic material supplied from the material supply unit 110. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 110. Examples of the binder include acrylic resins, epoxy resins, silicone resins, cellulose-based resins, other synthetic resins, or PLA (polylactic acid), PA (polyamide), PPS (polyphenylene sulfide), PEEK, and other thermoplastic resins.

2. Modification of Three-Dimensional Shaping Device

Figure 12:
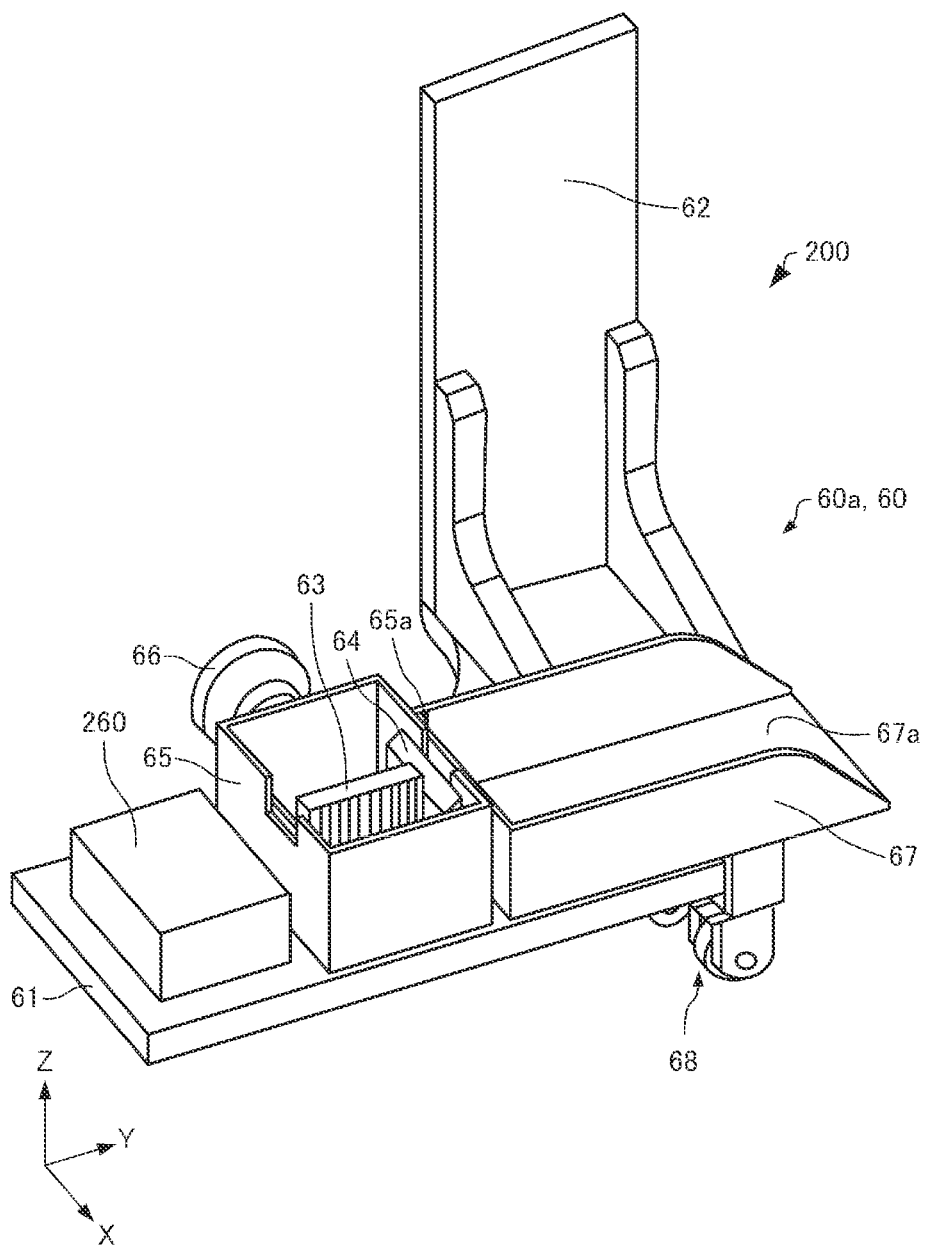
FIG. 12 is a perspective view schematically showing a first cleaning mechanism of a three-dimensional shaping device according to a modification of the present embodiment.

Next, a three-dimensional shaping device according to a modification of the present embodiment will be described with reference to the drawings. FIG. 12 is a perspective view schematically showing the first cleaning mechanism 60a of a three-dimensional shaping device 200 according to the modification of the present embodiment.

Hereinafter, in the three-dimensional shaping device 200 according to the modification of the present embodiment, members having the same functions as those of the constituent members of the three-dimensional shaping device 100 according to the present embodiment described above are denoted by the same reference numerals, and a detailed description thereof will be omitted.

As shown in FIG. 12, the three-dimensional shaping device 200 is different from the three-dimensional shaping device 100 described above in that the first cleaning mechanism 60a includes an inspection unit 260. The second cleaning mechanism 60b also includes, for example, the inspection unit 260.

The inspection unit 260 inspects clogging of the nozzle 160. For example, the inspection unit 260 inspects whether the clogging of the nozzle 160 is eliminated after the first cleaning mechanism 60a cleans the nozzle 160. The inspection unit 260 is, for example, an imaging device, and inspects the clogging of the nozzle 160 by imaging the nozzle 160. The form of the inspection unit 260 is not particularly limited as long as the clogging of the nozzle 160 can be inspected.

The inspection unit 260 is provided on the substrate 61. The inspection unit 260 is provided in the vicinity of the cleaning case 65. In the illustrated example, the inspection unit 260 is provided in the −Y-axis direction of the cleaning case 65.

After the first cleaning mechanism 60a cleans the nozzle 160, the control unit 90 controls the first cleaning moving unit 70a to position the inspection unit 260 directly below the nozzle 160. Next, the control unit 90 acquires inspection information from the inspection unit 260, and performs processing of determining whether the nozzle 160 is clogged. When the control unit 90 determines that the nozzle 160 is clogged, the control unit 90 causes the first cleaning mechanism 60a to clean the nozzle 160 again. The control unit 90 repeats the cleaning processing and the determination processing until it is determined that the nozzle 160 is not clogged.

The three-dimensional shaping device 200 includes the inspection unit 260 that inspects the clogging of the nozzle 160. Therefore, in the three-dimensional shaping device 200, it is possible to cause the first cleaning mechanism 60a to clean the nozzle 160 based on the inspection information from the inspection unit 260.

The embodiments and modifications described above are merely examples, and the present disclosure is not limited thereto. For example, each embodiment and each modification can be combined as appropriate.

The present disclosure includes a configuration substantially the same as the configuration described in the embodiment, for example, a configuration having the same function, method, and result, or a configuration having the same purpose and effect. In addition, the present disclosure includes a configuration acquired by replacing a non-essential portion of the configuration described in the embodiment. In addition, the present disclosure includes a configuration having the same function and effect as the configuration described in the embodiment, or a configuration capable of achieving the same purpose. In addition, the present disclosure includes a configuration in which a known technique is added to the configuration described in the embodiment.

The following contents are derived from the above-described embodiments and modifications.

One aspect of a three-dimensional shaping device includes:
  a discharge unit having a nozzle and configured to discharge a material toward a stage;
  a cleaning mechanism configured to clean the nozzle; and
  a moving unit configured to move the discharge unit and the cleaning mechanism relative to the stage, and
  the moving unit is configured to move the cleaning mechanism relative to the stage in conjunction with a movement of the discharge unit relative to the stage.

According to the three-dimensional shaping device, it is possible to reduce a moving distance of the cleaning mechanism when cleaning the nozzle.

In the aspect of the three-dimensional shaping device, the cleaning mechanism may include
  a purge unit configured to purge the material from the nozzle, and
  a brush unit including a brush that comes into contact with the nozzle.

According to the three-dimensional shaping device, the cleaning mechanism can receive the material purged by the purge unit and clean the nozzle by the brush unit.

The aspect of the three-dimensional shaping device may further include:
  a cleaning moving unit configured to move the cleaning mechanism, and the cleaning mechanism may be moved by the cleaning moving unit to clean the nozzle.

According to the three-dimensional shaping device, it is possible to prevent, by the cleaning of the nozzle, accuracy of an object to be shaped from being deteriorated.

In the aspect of the three-dimensional shaping device,
  the cleaning moving unit may move the cleaning mechanism to a first region including a region overlapping a nozzle opening of the nozzle and a second region not overlapping the nozzle opening of the nozzle when viewed from a discharge direction of the material, and
  the cleaning mechanism may clean the nozzle in the first region and not clean the nozzle in the second region.

According to the three-dimensional shaping device, the cleaning mechanism can be moved to the second region when the discharge unit discharges the material, and the cleaning mechanism does not interfere with the discharge of the discharge unit.

The aspect of the three-dimensional shaping device may further include:
  a support unit configured to support the discharge unit from a direction orthogonal to the discharge direction of the material,
  the support unit may include
    a support plate, and
    a protruding portion that protrudes from the support plate in the direction orthogonal to the discharge direction of the material and is coupled to the discharge unit, and
  the second region may be a region closer to the support plate than the discharge unit.

According to the three-dimensional shaping device, when a user performs maintenance or replacement of the discharge unit, the cleaning mechanism does not interfere.

In the aspect of the three-dimensional shaping device,
  the cleaning mechanism may include a discharge mechanism configured to discharge the material accumulated in the purge unit to a collection box in the second region.

According to the three-dimensional shaping device, the discharge mechanism can automatically discharge the accumulated material to the collection box.

In the aspect of the three-dimensional shaping device,
  the cleaning mechanism may include an inspection unit configured to inspect clogging of the nozzle.

According to the three-dimensional shaping device, the cleaning mechanism can clean the nozzle based on inspection information from the inspection unit.

The aspect of the three-dimensional shaping device may further include:
  a heating unit configured to heat a shaping region of the stage,
  the heating unit may be positioned above a position of a nozzle opening of the nozzle and below the cleaning mechanism during shaping,
  a layer made of the material discharged from the discharge unit may be formed in the shaping region, the heating unit may have a shape covering the shaping region when viewed from a discharge direction of the material, and the moving unit may move the heating unit relative to the stage in conjunction with the movement of the discharge unit relative to the stage.

According to the three-dimensional shaping device, when the material is discharged toward a first layer formed in the shaping region to form a second layer, the adhesion between the first layer and the second layer can be increased by the heating of the heating unit.

In the aspect of the three-dimensional shaping device, when the cleaning mechanism cleans the nozzle, the moving unit may move the nozzle opening of the nozzle above the heating unit.

According to the three-dimensional shaping device, the heating unit does not interfere when the cleaning mechanism cleans the nozzle.

The aspect of the three-dimensional shaping device may further include:

a first discharge unit and a second discharge unit as the discharge unit, and the cleaning mechanism may clean the nozzle of the first discharge unit during shaping by the second discharge unit.

According to the three-dimensional shaping device, it is possible to shorten the time for shaping the shaped object.

In the aspect of the three-dimensional shaping device, the moving unit may move the stage in a first direction orthogonal to a discharge direction of the material and a second direction orthogonal to the first direction, and move the discharge unit and the cleaning mechanism in a third direction parallel to the discharge direction of the material.

According to the three-dimensional shaping device, it is possible to improve the accuracy of the object to be shaped.

What is claimed is:

1. A three-dimensional shaping device comprising:
   a discharge head having a nozzle and configured to discharge a material toward a shaping region on a stage in a first direction, the shaping region extending along a first plane along second and third directions, the first, second, and third directions being perpendicular to each other;
   a heating plate that is substantially plate-shaped and has an opening therein, the heating plate having a top surface and a bottom surface outwardly opposite to each other along the first direction, the heating plate extending along a second plane along the second and third directions, the bottom surface of the heating plate facing the shaping region along the first direction;
   a cleaning mechanism configured to clean the nozzle, the cleaning mechanism being located above the top surface of the heating plate; and
   a motor configured to move the discharge head and the cleaning mechanism relative to the stage, wherein
   the motor is configured to move the cleaning mechanism relative to the stage along the second direction and move the discharge head relative to the stage along the first direction between a position where a tip of the nozzle is located below the bottom surface of the heating plate by passing through the opening and a position where the tip of the nozzle is above the top surface of the heating plate,
   an area along the second plane of the heating plate is larger than an area along the first plane of the shaping region, and
   the nozzle of the discharge head is selectively inserted into the opening of the heating plate via the motor to project from the bottom surface of the heating plate toward the stage.

2. The three-dimensional shaping device according to claim 1, wherein
   the cleaning mechanism includes
   a purge unit configured to purge the material from the nozzle, and
   a brush unit including a brush that comes into contact with the nozzle.

3. The three-dimensional shaping device according to claim 2, further comprising:
   a cleaning moving unit configured to move the cleaning mechanism, wherein
   the cleaning mechanism is moved by the cleaning moving unit to clean the nozzle.

4. The three-dimensional shaping device according to claim 3, wherein
   the cleaning moving unit is configured to move the cleaning mechanism to a first region including a region overlapping a nozzle opening of the nozzle and a second region not overlapping the nozzle opening of the nozzle when viewed along the first direction, and
   the cleaning mechanism is configured to clean the nozzle in the first region and not to clean the nozzle in the second region.

5. The three-dimensional shaping device according to claim 4, further comprising:
   a support unit configured to support the discharge head from the second direction, wherein
   the support unit includes
   a support plate, and
   a protruding portion that protrudes from the support plate in the second direction and is coupled to the discharge head, and
   the second region is a region closer to the support plate than the discharge head.

6. The three-dimensional shaping device according to claim 4, wherein
   the cleaning mechanism includes a discharge mechanism configured to discharge the material accumulated in the purge unit to a collection box in the second region.

7. The three-dimensional shaping device according to claim 1, wherein
   the cleaning mechanism includes an inspection unit configured to inspect clogging of the nozzle.

8. The three-dimensional shaping device according to claim 1, wherein
   the heating plate is configured to heat the shaping region of the stage, wherein
   the heating plate is positioned above a position of a nozzle opening of the nozzle and below the cleaning mechanism during shaping,
   a layer made of the material discharged from the discharge head is formed in the shaping region,
   the heating plate has a shape covering the shaping region when viewed along the first direction, and
   the motor is configured to move the heating plate relative to the stage in conjunction with the movement of the discharge head relative to the stage.

9. The three-dimensional shaping device according to claim 8, wherein
   when the cleaning mechanism cleans the nozzle, the motor moves the nozzle opening of the nozzle above the heating plate.

10. The three-dimensional shaping device according to claim 1, further comprising:
a first discharge head and a second discharge head as the discharge head, wherein
the cleaning mechanism is configured to clean the nozzle of the first discharge head during shaping by the second discharge head.

11. The three-dimensional shaping device according to claim 1, wherein
the motor is configured to move the discharge head and the cleaning mechanism in a direction parallel to the first direction, and move the stage in the second direction orthogonal to the first direction and a third direction orthogonal to the first direction and the second direction.

12. The three-dimensional shaping device according to claim 1, wherein
the discharge head includes a plasticization unit configured to plasticize the material, and the plasticization unit is located at an opposite side of the heating plate with respect to the stage.

13. The three-dimensional shaping device according to claim 1, wherein
the cleaning mechanism includes a substrate, a purge unit provided on the substrate and in which the material from the nozzle is purged, and a brush unit provided on the substrate and including a brush that comes into contact with the nozzle, and
the cleaning mechanism is configured such that a bottom surface of the purge unit is inclined with respect to the substrate with a first axis as a fulcrum.

14. The three-dimensional shaping device according to claim 7, further comprising:
a memory configured to store a program; and
a processor configured to execute the program so as to:
control the inspection unit and the motor;
acquire inspection information from the inspection unit after controlling the motor to clean the nozzle by the cleaning mechanism;
determine whether the nozzle is clogged; and
control the motor to clean the nozzle again by the cleaning mechanism when the processor determines that the nozzle is clogged.

15. The three-dimensional shaping device according to claim 1, wherein, when the cleaning mechanism cleans the nozzle, the motor is configured to reciprocate the cleaning mechanism relative to the stage along the second direction.

16. The three-dimensional shaping device according to claim 10, further comprising:
a first cleaning mechanism, as the cleaning mechanism, configured to clean the nozzle of the first discharge head and a second cleaning mechanism, as the cleaning mechanism, configured to clean the nozzle of the second discharge head, wherein
the first cleaning mechanism is configured to clean the nozzle of the first discharge head located above the top surface of the heating plate during shaping by the nozzle of the second discharge head located below the bottom surface of the heating plate, and
the second cleaning mechanism is configured to clean the nozzle of the second discharge head located above the top surface of the heating plate during shaping by the nozzle of the first discharge head located below the bottom surface of the heating plate.

* * * * *